US012465199B2

(12) United States Patent
Morton et al.

(10) Patent No.: US 12,465,199 B2
(45) Date of Patent: Nov. 11, 2025

(54) ENDOSCOPE COMPRISING A Y-CONNECTOR HAVING A CURVED INSTRUMENT INSERTION CHANNEL

(71) Applicant: AMBU A/S, Ballerup (DK)

(72) Inventors: Alistair David Morton, København (DK); Victor Silbermann, Them (DK); Søren Pedersen, Bagsværd (DK)

(73) Assignee: AMBU A/S, Ballerup (DK)

( * ) Notice: Subject to any disclaimer, the term of this patent is extended or adjusted under 35 U.S.C. 154(b) by 420 days.

(21) Appl. No.: 17/991,139

(22) Filed: Nov. 21, 2022

(65) Prior Publication Data

US 2023/0157527 A1    May 25, 2023

(30) Foreign Application Priority Data

Nov. 23, 2021 (EP) ...................................... 21209899

(51) Int. Cl.
*A61B 1/005* (2006.01)
*A61B 1/00* (2006.01)
(Continued)

(52) U.S. Cl.
CPC .............. *A61B 1/0052* (2013.01); *A61B 1/05* (2013.01)

(58) Field of Classification Search
CPC .............. A61B 1/0052; A61B 1/00119; A61B 1/001828; A61B 1/015; A61B 1/00066
See application file for complete search history.

(56) References Cited

U.S. PATENT DOCUMENTS 4,705,023 A    11/1987 Arai
4,972,828 A    11/1990 Ito
(Continued)

FOREIGN PATENT DOCUMENTS

EP    1737335 A2    1/2007
EP    3415073 A2    12/2018
(Continued)

OTHER PUBLICATIONS

Search Report received for EP Application No. 21209899.0, mailed on May 10, 2022, 8 pages.
(Continued)

*Primary Examiner* — Anh Tuan T Nguyen
*Assistant Examiner* — Rynae E Boler
(74) *Attorney, Agent, or Firm* — Faegre Drinker Biddle & Reath LLP

(57) ABSTRACT

An endoscope including a handle and an insertion cord. The handle includes a Y-connector having: a first branch/socket having a first opening from which a first channel extends; a second branch/socket having a second opening from which a second channel extends; and a third branch/socket having a third opening, wherein the first channel and the second channel join each other in a third joined channel and the third joined channel extends inside the third branch or socket towards the third opening. The first channel and the third joined channel form together an instrument insertion channel of the Y-connector. The first channel is a curved channel having a curvature at least in sections inside the first branch or socket and/or the third joined channel is a curved channel having a curvature at least in sections inside the third branch or socket.

21 Claims, 5 Drawing Sheets

(51) Int. Cl.
*A61B 1/018* (2006.01)
*A61B 1/05* (2006.01)

(56) References Cited

U.S. PATENT DOCUMENTS

| | | | |
|---|---|---|---|
| 5,483,951 A | | 1/1996 | Frassica et al. |
| 5,693,025 A | | 12/1997 | Stevens |
| 5,888,191 A | * | 3/1999 | Akiba ................ A61B 1/00137 |
| | | | 600/156 |
| 7,922,650 B2 | | 4/2011 | McWeeney et al. |
| 2014/0066706 A1 | | 3/2014 | Mcweeney et al. |
| 2016/0249792 A1 | * | 9/2016 | Ogawa ............... A61B 1/00128 |
| | | | 600/153 |
| 2020/0359879 A1 | * | 11/2020 | Cahill .................. A61B 1/0057 |
| 2021/0235973 A1 | * | 8/2021 | Gray .................. A61B 1/00066 |
| 2021/0338065 A1 | * | 11/2021 | Yoshinaga .......... A61B 1/00066 |
| 2024/0057851 A1 | | 2/2024 | Busch et al. |

FOREIGN PATENT DOCUMENTS

| | | | |
|---|---|---|---|
| JP | 2002102155 A | * | 4/2002 |
| JP | 2011177355 A | * | 9/2011 |
| WO | 2005/094665 A2 | | 10/2005 |
| WO | 2007117750 A2 | | 10/2007 |
| WO | 2020/003237 A1 | | 1/2020 |
| WO | 2020236546 A1 | | 11/2020 |

OTHER PUBLICATIONS

Office Action received for European Application No. 21209899, mailed on Mar. 27, 2024, 5 pages.
Office Action received for European Application No. 21209899, mailed on Sep. 25, 2024, 5 pages.

* cited by examiner

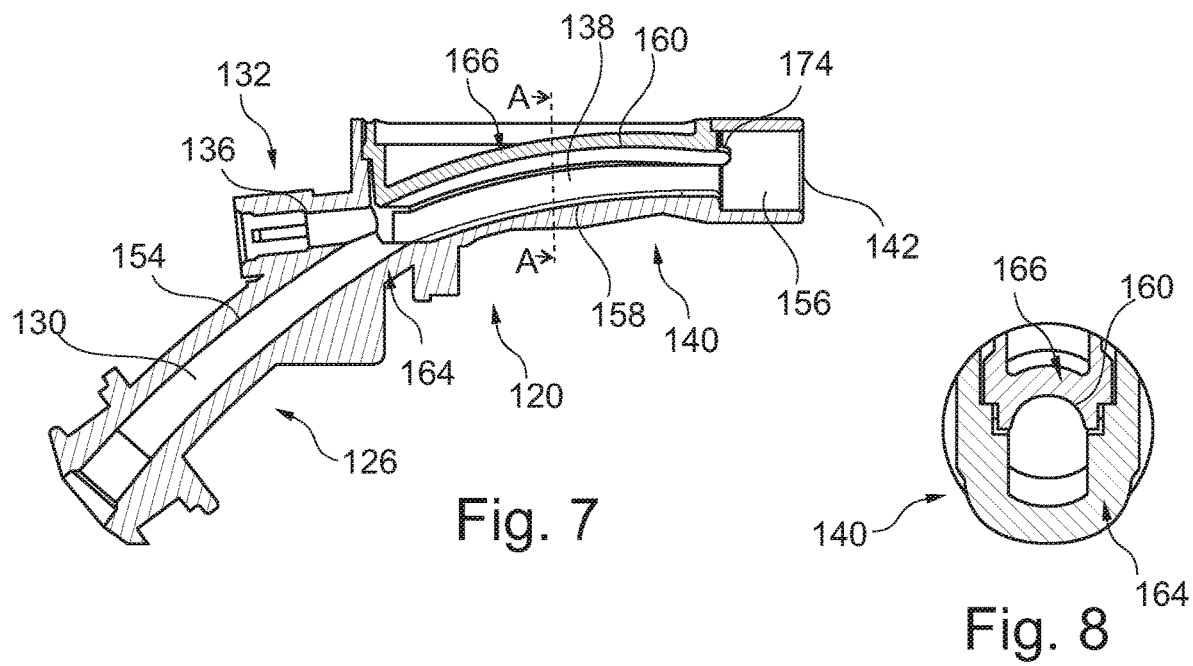
Fig. 7
Fig. 8
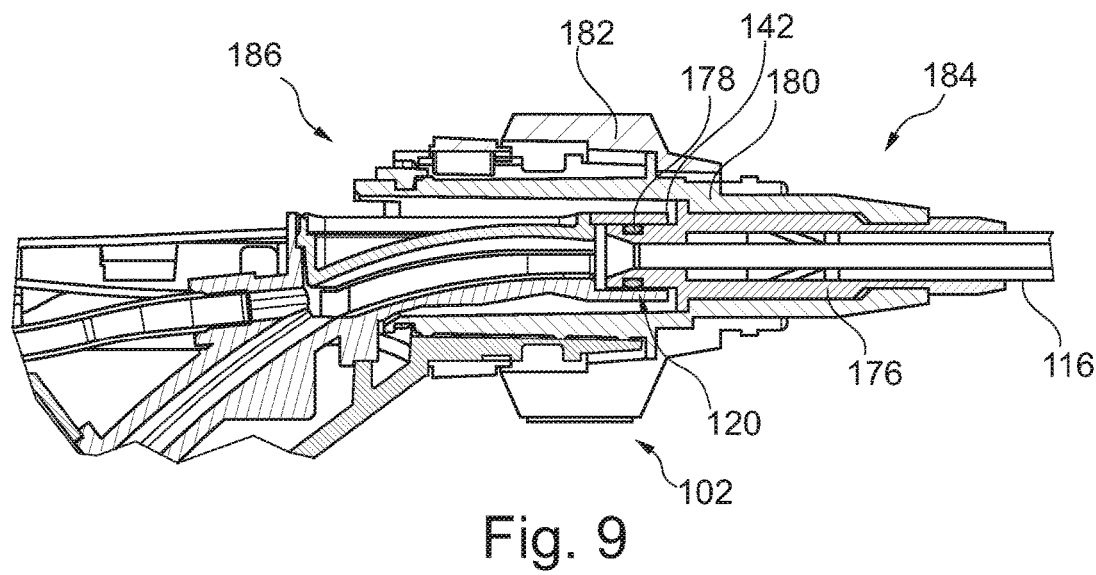
Fig. 9

ENDOSCOPE COMPRISING A Y-CONNECTOR HAVING A CURVED INSTRUMENT INSERTION CHANNEL

CROSS-REFERENCE TO RELATED APPLICATIONS

This application claims priority from and the benefit of European Patent Application No. EP 2120 9899.0, filed Nov. 23, 2021, which is incorporated by reference herein in its entirety.

TECHNICAL FIELD

The present disclosure relates to an endoscope comprising a handle with a Y-connector having first, second and third branches, first and second channels in the first and second branches joined and extending inside the third branch and connected to a working channel tube.

BACKGROUND

Endoscopes and similar specialized instruments such as bronchoscopes, arthroscopes, colonoscopes, laparoscopes, gastroscopes and duodenoscopes are well known from the related art and are used for visual examination and diagnosis of hollow organs and body cavities, as well as to assist in surgery, e.g. for a targeted tissue sampling. Both reusable and disposable endoscopes are known from the related art. Known endoscopes usually comprise: an endoscope handle or interface with a working channel access port; an insertion cord extending from the endoscope handle or interface to be inserted into a patient's body cavity and comprising an insertion tube, a bending section and a distal tip unit; and a working channel. The working channel extents from the working channel access port at the endoscope handle to the distal tip unit.

The working channel is usually formed by at least: a Y-connector (or biopsy connector); a (flexible) working channel tube arranged inside the endoscope handle, the insertion tube and the bending section; and a distal tip housing. A surgical instrument may be guided through the working channel into the patient's body cavity. In particular, the surgical instrument may be inserted into the working channel access port and may be guided through the Y-connector, the working channel tube and the distal tip housing into the patient's body cavity.

Y-shaped biopsy connectors or Y-connectors are well known from the related art. Known Y-connectors usually comprise instrument insertion channels consisting of two merging straight channels that are angled with respect to each other. An example of a Y-connector with two straight channels is e.g. disclosed in WO 2007/117 750 A2 or U.S. Pat. No. 7,922,650 B2.

When a surgical instrument is inserted into an instrument insertion channel consisting of two merging straight channels angled with respect to each other, bending of the surgical instrument requires a certain bending force. Because of the bending force, the user inserting the surgical instrument into the working channel tube feels resistance while inserting the instrument. This resistance in the insertion process is disadvantageous as it compromises a user experience during insertion of the surgical instrument. To sum up, the user receives an unwanted, disadvantageous haptic feedback when the surgical instrument is bent inside the Y-connector.

WO 2020/236546 A1 discloses an endoscope including an adapter with openings in a side or proximal end of the adapter. One or more wires enter through the openings in the adapter to guide the wires to a corresponding lumen other than the working channel to the distal end of the shaft.

SUMMARY

In view of the above-described problems, it is an object of the present disclosure to avoid or at least to mitigate the disadvantages of the related art, in particular to provide an endoscope in which a surgical instrument can be inserted into a working channel with low resistance.

This object is solved by an endoscope in accordance with claim 1, by a system including the endoscope and a monitor, and by a method of using the endoscope which includes pre-bending an instrument with the endoscope to facilitate insertion via the endoscope. Advantageous aspects of the present disclosure are claimed in the dependent claims and/or are described herein below.

The present disclosure relates to an endoscope comprising: an endoscope handle or interface; and an insertion cord extending from the endoscope handle or interface and configured to be inserted into a patient's body cavity. The endoscope handle comprises a Y-connector (biopsy connector) having: a first branch or socket having a first opening from which a first channel extends; a second branch or socket having a second opening from which a second channel extends; and a third branch or socket having a third opening, wherein the first channel and the second channel join each other in a third joined channel and the third joined channel extends inside the third branch or socket towards the third opening. The first channel and the third joined channel form together an instrument insertion channel of the Y-connector, the second channel and the third joined channel form together a suction channel of the Y-connector, and a working channel tube is directly or indirectly connected to the third joined channel and extends from the endoscope handle or interface into the insertion cord. According to the disclosure, the first channel is a curved channel having a curvature at least in sections inside the first branch or socket and/or the third joined channel is a curved channel having a curvature at least in sections inside the third branch or socket.

It is to be understood that "having a curvature at least in sections" means that either the whole channel inside the respective branch or socket may be curved, or only a section/portion of the channel may be curved.

It is to be understood that the present disclosure relates to three (independent) embodiments: According to a first embodiment, only the first channel is a curved channel having a curvature at least in sections inside the first branch or socket. According to a second embodiment, only the third joined channel is a curved channel having a curvature at least in sections inside the third branch or socket. According to a third embodiment, the first channel is a curved channel having a curvature at least in sections inside the first branch or socket and the third joined channel is a curved channel having a curvature at least in sections inside the third branch or socket.

Said differently, according to the first embodiment, at least a portion/section of the first channel, that runs/is positioned/arranged inside the first branch or socket, is curved. It is to be understood that the curved portion/section according to the first embodiment is a channel portion/section of a specific length inside the first branch or socket. I.e. a provision of only a rounded transition edge between two straight channels does not meet the feature of a "curvature inside the first branch or socket". E.g., a majority-length portion of the first channel (at least 50% of the first channel) may be (continuously) curved. It is to be understood that according to the first embodiment, the third joined channel may be a straight channel.

Further, according to the second embodiment, at least a portion/section of the third joined channel, that runs/is positioned/arranged inside the third branch or socket, may be curved. It is to be understood that the curved portion/section according to the second embodiment is a channel portion/section of a specific length inside the third branch or socket. I.e. a provision of only a rounded transition edge between two straight channels does not meet the feature of a "curvature inside the third branch or socket". E.g., a majority-length portion of the third joined channel (at least 50% of the third joined channel) may be (continuously) curved. It is to be understood that according to the second embodiment, the first channel may be a straight channel.

Moreover, according to the third embodiment, both a portion/section of the first channel and a portion/section of the third joined channel may be curved, resulting e.g. in a banana-shape of the instrument insertion channel formed by the first channel and the third joined channel, in particular in case of a continuous curvature in a transition area between the first channel and the third joined channel. It is to be understood that according to the third embodiment, neither the first channel nor the third joined channel are entirely straight, however both the first channel and the third joined channel may have straight portions/sections.

When a (surgical) instrument is inserted into the Y-connector, the instrument enters through the first opening of the first branch or socket and is guided through the first channel and the third joined channel (forming in combination the instrument insertion channel) into the working channel tube directly or indirectly connected to the third joined channel. The (surgical) instrument is bent when guided through the instrument insertion channel. In particular, the (surgical) instrument is inserted into the instrument insertion channel via the first channel and hits a wall surface of the third joined channel at a landing point. The (surgical) instrument is bent between a contacting point, which is a point of contact between a (radial inner) wall surface of the first channel and the instrument, and the landing point in the third joined channel.

The endoscope according to the first embodiment of the present disclosure provides a number of advantages. In particular, the curvature of the first channel moves the contacting point of the first channel away from the third joined channel and the landing point. Therefore, a distance between the landing point and the contacting point is increased. The distance between the contacting point and the landing point functions as a bending lever. The longer the bending lever, the smaller force is required to bend the instrument. Therefore, the curvature of the first channel decreases the force needed to bend the instrument.

The endoscope according to the second embodiment of the present disclosure also provides a number of advantages. The curvature of the third joined channel decreases an angle (landing angle) at which the (surgical) instrument hits the landing point. E.g., when the third joined channel is curved, the angle between a tangent to a curved (radial outer) surface of the third joined channel in the landing point and an axis of the (surgical) instrument may be smaller compared to a case in which a straight third joined channel is provided. The smaller landing angle results in less resistance during insertion of the instrument. In particular, the smaller landing angle ensures a softer landing, or said differently, a rate of change of a landing force is reduced, which gives a softer feel to a user. Preferably, the landing force is applied slowly and is thus rather difficult to notice for the user. Further, the instrument can be pushed more easily along a curved surface of the third joined channel. The instrument is preferably continuously bent along the curved third joined channel. Furthermore, the curvature of the third joined channel may increase a length of the third joined channel and therefore a distance from the landing point to the third opening. As the instrument is bent over a longer distance, the force required to bend the instrument decreases.

To sum up, the curvature of the first channel and/or of the third joined channel decreases the force needed to bend the instrument and therefore provides less resistance when the instrument is inserted into the Y-connector and guided through the instrument insertion channel. It is clear that the third embodiment combines the positive technical effects of the first embodiment and of the second embodiment and thus constitutes an especially preferred embodiment according to the present disclosure. When the first channel is curved, the contacting point is moved away from the third joined channel. Thus, the bending lever of the inserted instrument is increased. When the third joined channel is curved, the landing angle of the instrument decreases. The smaller landing angle eases the insertion of the instrument into the third joined channel. Further, the instrument is bent over a longer distance because the curvature increases the length of the third joined channel. Therefore, a resistance when inserting the instrument into the Y-connector may be appropriately reduced.

It is to be understood that the Y-connector may be attached to a handle housing of the endoscope handle or interface, i.e. may be integrated in the endoscope handle or interface, and may be provided to insert a surgical instrument into the working channel tube. The first opening of the first branch or socket may therefore be considered as an access opening provided for inserting the surgical instrument. The first channel inside the first branch or socket may be designated as a biopsy channel configured to guide the surgical instrument into the Y-connector towards a bifurcation point, from which bifurcation point the surgical instrument is further guided through the third joined channel. The first channel runs inside the first branch or socket. The third joined channel runs inside the third branch or socket. The first channel and the third joined channel form together the instrument insertion channel. A working channel access port or biopsy port may be provided which is connected to the Y-connector, in particular to the first branch or socket. Therefore, it can be said that the instrument insertion channel is preferably configured/provided to guide the surgical instrument from the biopsy port/working channel access port to the working channel tube.

Moreover, it is to be understood that the second branch or socket may be connected to a suction valve provided in the endoscope handle, e.g. via a suction tube, and—via the suction valve—to an external suction device like a vacuum pump. The second channel running inside the second branch or socket and the third joined channel form together the suction channel through which liquids and/or debris may be sucked out of the patient's body cavity.

Further, it is to be understood that the first channel and the second channel join each other, i.e. merge into each other, to form the third joined channel. The three channels preferably form together a Y-shape/are preferably arranged in a Y-shape. In particular, the three channels meet at a common bifurcation point and extend in different directions from the common bifurcation point. The first opening and the second opening may be arranged so as to point approximately in an opposite direction compared to the third opening. In particular, the first opening and the second opening may essentially point in a proximal direction, and the third opening may essentially point in a distal direction. The first branch or socket and the second branch or socket may be slightly angled with respect to each other, in particular in an acute angle.

The first channel may be considered to be curved away from the second channel. In a longitudinal sectional view, the first channel may have a curvature at least in sections. The curvature may be described so as to have a radial inner side/wall surface and a radial outer side/wall surface. The radial inner side (inside of curve) may be considered as the side of the first channel in which a course when running around the curved portion/section is smaller compared to the radial outer side (outside of curve). The first channel may be curved in a way that the radial outer side is closer to the second channel than the radial inner side.

Preferably, the first channel is formed so as to be configured to pre-bend the instrument inserted into the instrument insertion channel inside the first branch or socket through its curvature, in particular through three-point-bending. As discussed above, the first channel may be curved at least in sections. The curve of the first channel may have the radial inner side or wall surface and the radial outer side or wall surface. The inner side of the curve may be defined as the side of the curve with the smaller distance to run around the curve. The instrument inserted into the instrument insertion channel may be pre-bent in the first channel on the inner side of the curve.

It is to be understood that three-point-bending means that the instrument touches three points at the same time and is bent between them. The three "bending points" may be a point on the inner surface of the curved first channel, i.e. the contacting point in the first channel, the landing point on the radial outer surface of the third joined channel, and a radial outer point of the first opening. The pre-bending of the instrument in the first channel eases the insertion of the instrument. By pre-bending the instrument in the first channel the bending force may be spread over a larger distance and the force needed to insert the instrument decreases.

Said differently, the first channel of the biopsy connector preferably has a specific curvature enabling a gradual pre-bending of an inserted instrument, thus reducing or even avoiding any abrupt increase in resistance during the insertion of the instrument.

Preferably, the first branch or socket has a main extension direction or axis and an extension direction (vector) of the first channel is at least in sections, in particular in an (entry) portion of the first channel starting from the first opening, angled with respect to the main extension direction or axis of the first branch or socket in a direction away from the third opening respectively the working channel tube.

The main extension direction or axis of the first branch or socket may be considered as a direction in which the first branch or socket extends. It is to be understood that "angled in a direction away from the third opening respectively the working channel tube" means that when the main extension direction or axis of the first branch or socket is considered as a reference, at least a portion of the first channel, starting in particular from the first opening, has an extension direction which is angled with respect to the main extension direction or axis of the first branch or socket such that said extension direction is not directed (further) towards the third opening/the working channel tube, but (further) away from the third opening/the working channel tube and may thus be negatively or anti-clockwise angled. The extension direction of the first channel may thus be angled with respect to the main extension direction or axis of the first branch or socket in a negative angle (anticlockwise), in particular in an entry portion/part of the first channel. In particular, a first vector may define the main extension direction or axis of the first branch or socket, wherein a starting point of the first vector is closer to the first opening than an end point of the first vector so that the first vector points essentially away from the first opening. Further, another second vector may define the extension direction of the first channel, wherein a starting point of the second vector is also closer to the first opening than an end point of the second vector so that the second vector also points away from the first opening. Preferably the first vector defining the main extension direction or axis of the first branch or socket and the second vector defining the extension direction of the first channel are angled such in a portion of the first channel that the second vector is negatively or anti-clockwise angled with respect to the first vector. Preferably, the negative angle is between 0° and 20°, especially preferred between 5° and 20°.

The main extension direction or axis of the first branch or socket may e.g. coincide with a tangent on the inner side of the curved first channel in a contacting point. Alternatively or additionally, the main extension direction may be defined by a center of the first opening and the bifurcation point where the first channel, the second channel and the third joined channel (extension directions/axes in an end portion of the respective channels) meet. The extension direction of the first channel in a first/starting/entry portion of the first channel starting from the first opening may be straight, i.e. not curved.

In other words, preferably a shape or extension direction/course of the first channel is not the same as the shape or extension direction/course of the first branch or socket inside of which the first channel is provided.

Preferably, a cross-section of the first channel (and a cross-section of the second channel) is at least in sections essentially circular, and a cross-section of the third joined channel has at least in sections an essentially elongated hole or oblong hole shape. The elongated hole shape of the third joined channel may result in a step between a radial outer wall surface of a curved first channel and a radial outer wall surface of a curved third joined channel. A trajectory of the radial outer wall surface of the curved first channel may thus not transition directly in a trajectory of the radial outer wall surface of the curved third joined channel. The elongated hole shape of the cross-section of the third joined channel may result in a retracted radial outer wall surface of the third joined channel. Said differently, preferably a portion of a wall of the third joined channel is retracted or distanced with respect to a trajectory of the first channel. Retracting the third joined channel may ensure that an instrument does not get caught at a step or edge in a transition area between the first channel and the third joined channel. When the cross-section of the third joined channel has at least in sections an essentially oblong hole shape, the third channel preferably forms a chamber with an upper double-convexly curved wall and a lower curved wall. The upper double convexly curved wall preferably is provided for suitably guiding the surgical tool towards the third opening. The lower curved wall is provided for directing clots or clumps sucked through the working channel tube towards the second opening.

It is to be understood that a trajectory of the first channel may mean an extension of (an end portion of) the radial outer wall surface of the curved first channel. If the radial outer wall surface of the curved third joined channel followed the trajectory of the first channel, the curve of the first channel and the curve of the third joined channel would continue/transition into each other without a step. However, as the (radial outer) wall of the third joined channel is retracted, there is the step between the radial outer wall surface of the curved third joined channel and the radial outer wall surface of the curved first channel. Together with the (radial outer) wall the landing point is preferably retracted. Thus, a distance between the landing point and the first channel and therefore a distance between the contacting point in the first channel and the landing point is increased. A longer distance between the landing point and the contacting point may increase the bending lever of the inserted instrument and therefore may decrease a force required to bend the instrument.

Preferably, another (radial inner) portion of the wall of the first channel directly transitions into a (radial inner) portion of a wall of the third joined channel and is continuously curved in a transition area between the first channel and the third joined channel. The radial inner side/wall surface of the curved first channel may transition into the radial inner side/wall surface of the curved third joined channel. Both the first channel and the third joined channel may be curved in a way to smoothly transition/merge into each other. Continuously curved means that there is preferably no kink between the two curves/curved wall surfaces. The transition area between the first channel and the third joined channel may be an area where the two channels transition into each other. Because of the continuous curvature of the two channels, the first channel and the third joined channel may form an at least in sections continuously curved instrument insertion channel together. The curved instrument insertion channel may allow the instrument to be inserted all the way from the biopsy port to the working channel tube without any obstacles. The smooth transition between the first channel and the third joined channel may let the instrument pass through the channels with low resistance.

Preferably, a jump is provided in the third joined channel adjacent or close to the third opening, the jump being configured to direct an instrument inserted into the instrument insertion channel essentially centrally through the third opening. Essentially centrally means that the instrument preferably runs through the middle of the third opening. The instrument preferably does not touch a wall surface adjacent/ in an area of the third opening. The jump may thus be provided to guide the instrument into the working channel tube without any contact of the instrument and the wall adjacent the third opening. Especially preferred, the instrument does not touch any of the walls adjacent the third opening and walls in an entry portion of the working channel tube until the instrument is fully bent. Any contact with such walls during bending would increase an insertion resistance of the instrument, which is disadvantageous.

Preferably, the second channel has a main extension direction forming essentially a tangent to a wall surface of the third joined channel. The main extension direction of the second channel may form a tangent to an inner side of the curved third joined channel. The second channel and the third joined channel form the suction channel together and the second channel may extend tangentially with respect to the inner wall surface of the third joined channel. This preferably results in a generally straight suction channel. A tangential direction of the second channel may ensure that the fluid in the suction channel has a free flowing direction from the working channel tube to the second channel. It is preferable that the suction channel has no or only limited curvatures and/or obstacles that hinder the fluid to be sucked through the suction channel. An essentially straight suction channel may increase an efficiency of the suction behavior of the endoscope. In particular, a suction tube connected to the second channel may thus also be arranged essentially at a tangent to the third joined channel, so that clots sucked through the working channel tube will naturally flow into the suction tube.

Preferably, the instrument insertion channel formed by the first channel and the third joined channel extends such that an imaginary straight line forming a tangent on a (radial inner) wall surface of the first channel and contacting the wall surface of the first channel at a contact(ing) point hits or cuts a (radial outer) wall surface of the third joined channel at a landing point, and contacts or starts at an (radial outer) point of the first opening (seen in a longitudinal sectional view of the Y-connector).

The imaginary straight line may start at the radial outer point of the first opening. The straight line may then extend to the contacting point of the radial inner wall surface of the first channel. From there the straight line may extend to the landing point. The straight line may be the line that has the largest extension possible in/inside the first channel. The three contact points of the straight line may be essentially the same points that provide the three-point bending explained above. During insertion of the instrument and before bending starts, the instrument may essentially follow the imaginary straight line and is only minimal or not at all bent.

Preferably, (seen in a longitudinal sectional view of the Y-connector) a tangent on the third joined channel defined by the landing point (and preferably a curvature at the landing point) and the imaginary straight line form a landing angle between 0° and 20°, preferably between 0° and 16°.

The tangent on the third joined channel in the landing point and the imaginary straight line preferably have a rather small angle between them. Preferably, the tangent on the curved third joined channel in the landing point and the extension direction of the instrument form essentially the same angle during insertion of the instrument. To ensure smooth landing of the instrument and low resistance when the instrument hits the wall surface of the third joined channel in the landing point, the landing angle is preferably between 0° and 20°, preferably between 0° and 16°. The smaller the landing angle, the smaller the resistance of the instrument during insertion and bending.

Preferably, the first channel and the third joined channel are curved channels having a curvature at least in sections, wherein a curvature of the first channel directly transitions into a curvature of the third joined channel, and wherein a majority-length portion, preferably at least 60%, especially preferred at least 70%, of the instrument insertion channel formed by the first channel and the third joined channel is (continuously) curved.

An especially preferred embodiment according to the present disclosure is thus characterized in that at least a majority-length portion (i.e. at least 50% of a length) of the instrument insertion channel (formed by the first channel and the third joined channel in combination) is continuously curved. A continuous curvature is preferably to be understood as a curvature without straight sections and without kinks in between. Radii of curvature may be different in different portions of the curved majority-length portion of the instrument insertion channel. A continuous curvature over a majority-length portion (i.e. essentially a banana-shaped design of the instrument insertion channel) preferably makes it possible to provide an increased bending lever and a decreased landing angle and thus enables a smooth bending with low resistance.

Seen in a longitudinal sectional view of the Y-connector, a trajectory of the curved first channel and a trajectory of the curved third joined channel may form one continuous curve on at least a (radial inner) side/wall. In other words, the trajectory of the curved first channel may transition into the trajectory of the curved third joined channel to form one combined curved channel. Especially preferred, the combined instrument insertion channel is continuously curved at least in sections. That means the combined instrument insertion channel may comprise a rather long curved section that is not interrupted by any straight section.

Preferably, the first channel has at least in sections a first radius of curvature and the third joined channel has at least in sections a third radius of curvature, wherein the first radius of curvature is greater than the third radius of curvature; and/or the first channel has a first radiant and the third joined channel has a third radiant, wherein the third radiant is greater than the first radiant. The radius of curvature and the radiant of both curved channels may influence the bending behavior of the inserted instrument.

Preferably, a curvature of the first channel has a radius of curvature between 50 mm and 150 mm, especially preferred of around 100 mm. Additionally or alternatively, a radius of curvature of the third joined channel may be between 20 mm and 80 mm, especially preferred around 50 mm. It is conceivable that the first channel and/or the third joined channel comprise multiple sections with different radii of curvature. The sections may be adjacent each other or with a straight section in between. The first radiant of the first channel may be between 10° and 30°. The third radiant of the third joined channel may be between 30° and 50°. It has in particular turned out that it may be advantageous to start the bending gradually/slowly at a greater radius of curvature and a smaller arc/radiant in the first channel, and to accelerate the bending with a smaller radius of curvature and a bigger arc/radiant in the third joined channel.

The Y-connector is preferably manufactured by injection molding. Therefore, it may be necessary to remove cores used in the injection molding process after injection-molding in order to receive the finished Y-connector. A rather long molding core may be provided inside the first branch or socket, which forms the first channel. To be able to remove said long molding core, the first radius of curvature is preferably rather great and the first radiant is preferably rather small. With respect to the third joined channel there exists preferably not the same problem, since the Y-connector is preferably a multi-piece part and the core for the third channel may be removed via an opening, which is to be covered by a lid part when assembling the multi-piece Y-connector.

Preferably, the Y-connector is therefore a multi-piece connector comprising at least a first connector part and a separate second connector part (the lid part) that are attached to each other. The Y-connector thus may comprise the first connector part that is the connector main body and the separate second connector part that is the lid (part) for the connector main body. The first connector part may comprise the first branch or socket including the first opening, the second branch or socket including the second opening, and a part/portion of the third branch or socket. The parts/portions of the third branch or socket comprised in the first connector part are preferably at least the radial inner wall surface of the third channel and the third opening. The third branch or socket of the connector main body may be open/may have an opening, in particular in a radial outer direction. The second connector part may close the third branch or socket and may comprise the radial outer wall surface of the third joined channel. Together, the first and second connector parts form the third branch or socket and the third channel. The configuration of the Y-connector as the multi-piece connector preferably allows the Y-connector to be manufactured by injection molding. It would in particular be difficult to injection mold the Y-connector, if the curved Y-connector consisted of one single piece. Injection molding of the Y-connector preferably allows to produce a low-cost, single-use connector made from a (thermo)plastic/polymer material.

Preferably, it thus applies that the first channel and the second channel of the Y-connector are entirely formed by the first connector part, and the third joined channel of the Y-connector is formed by both the first connector part and the second connector part. The connector main body may comprise the first channel and the second channel. The third joined channel may be formed by both the connector main body and the lid. The connector main body may comprise the radial inner wall surface and the lid may comprise the radial outer wall surface of the third joined channel. If the radial outer wall surface is a part/portion of the second connector part, it is easy to retract the radial outer wall surface of the third joined channel from/with respect to the trajectory of the first channel. Therefore, the advantages of the retracted outer wall surface, especially the retracted landing point, are achieved easily through the provision of a multi-piece connector having in particular the lid (part) according to the present disclosure.

Preferably, the endoscope handle comprises a proximal handle portion and a distal handle portion and the distal handle portion is rotatable with respect to the proximal handle portion. The distal handle portion may comprise a rotatable connector that is connected to the insertion cord. The insertion cord and the distal handle portion may be rotatable together with respect to the proximal handle portion. This may improve a handling of the endoscope, since a user can twist the handle relative to the insertion cord and the working channel.

Preferably, the third opening of the Y-connector is connected to a rotatable adapter. A sealing ring may be provided between the Y-connector and the rotatable adapter. The rotatable adapter may be connected to the working channel tube. The rotatable adapter may rotate inside a portion of the third joined channel/inside the third opening and may thus allow the working channel tube to rotate. The sealing ring may seal an outside of the rotatable adapter against the third joined channel. The rotatable handle may allow the instrument to be inserted into the working channel tube in such an angle that the insertion is convenient for a user.

Preferably the endoscope is a single use endoscope, meaning that the endoscope optimized for single use, e.g. in that it is preferably made of limited number of elements to be assembled, as this will lower the cost of assembly, which is a relatively large proportion of the total cost of the endoscope. This also mean that parts of the endoscope, such as the Y-connector, preferably is made up by a limited number of elements, and with focus on ease of assembly, and in materials that enable the parts to be made at low cost, e.g. by plastic moulding. This compared to traditional reusable endoscopes, where focus is to provide endoscopes, which must be able to withstand the rather aggressive cleaning processes and general harsh handling over time.

The object of the present disclosure is also solved by a system comprising an endoscope as described above and a monitor.

BRIEF DESCRIPTION OF FIGURES

The disclosure is explained in more detail below using preferred embodiments and referring to the accompanying figures.

FIG. 7 shows a longitudinal sectional view of the Y-connector according to the first embodiment.

FIG. 8 shows a cross-sectional view of the Y-connector taken at line A-A in FIG. 7.

FIG. 9 shows another longitudinal sectional view through a portion of the endoscope handle including the Y-connector according to the first embodiment.

The figures are schematic in nature and serve only to understand the disclosure. The features of the different embodiments can be interchanged among each other.

DETAILED DESCRIPTION

Figure 1:
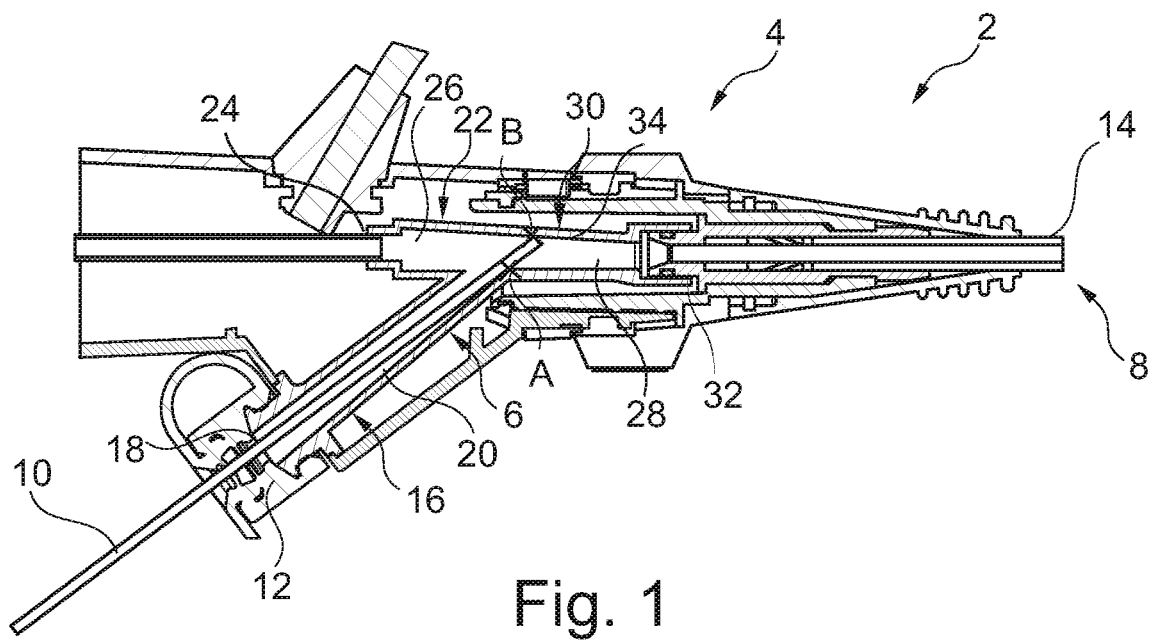
FIG. 1 shows a longitudinal sectional view through a portion of an endoscope handle including a Y-connector according to the related art.

A Y-shaped biopsy connector of a related art endoscope 2 with two straight channels is e.g. shown in enclosed FIG. 1. In particular, FIG. 1 is a longitudinal sectional view of an endoscope handle 4 including a Y-connector 6. The Y-connector 6 is provided in the endoscope handle 4 of the endoscope 2. The endoscope 2 comprises a working channel 8 to guide a surgical instrument 10 into a patient's body cavity. The working channel 8 comprises a working channel access port 12, the Y-connector 6, and a working channel tube 14. The components are arranged in this order in a proximal-distal-direction in the endoscope handle 4. The Y-connector 6 comprises a first branch or socket 16 with a first opening 18 from which a first channel 20 extends. The first channel 20 may be designated as a biopsy channel. Further, the Y-connector 6 comprises a second branch or socket 22 with a second opening 24. A second channel 26 extends from the second opening 24 and runs inside the second branch or socket 22. The second channel 26 may be a portion of a suction channel provided for aspirating fluid from the patient's body cavity. The second channel 26 joins into the first channel 20 to form a third joined channel 28. The third joined channel 28 extends inside a third branch or socket 30 towards a third opening 32. The third opening 32 is connected to the working channel tube 14.

When the surgical instrument 10 is inserted into the working channel 8, the surgical instrument 10 is bent from an extension direction of the working channel access port 12 and the first channel 20 to the extension direction of the third joined channel 28 and the working channel tube 14. Therefore, the surgical instrument 10 is inserted through the first channel 20 or biopsy channel and hits a wall surface 34 of the third joined channel 28 at a landing/bending point B. Then the bending takes place and a bending radius is defined by a distance between the landing/bending point B and a contacting point A where the surgical instrument 10 leaves the first channel 20. As the distance between the contacting point A and the landing/bending point B is rather small, bending of the surgical instrument 10 requires a certain force. Because of the bending force, the user inserting the surgical instrument 10 into the working channel tube 14 feels resistance while inserting the instrument 10. This resistance in the insertion process is disadvantageous as it compromises a user experience during insertion of the surgical instrument 10. To sum up, the user receives an unwanted, disadvantageous haptic feedback when the surgical instrument 10 is bent inside the Y-connector 6.

Figure 2:
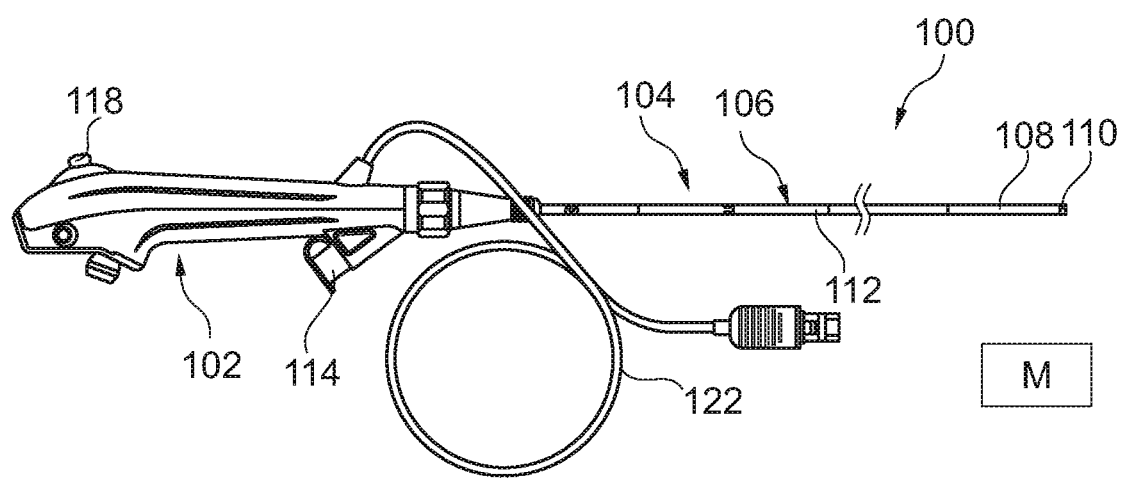
FIG. 2 shows a side view of an endoscope according to the present disclosure.

FIG. 2 shows a side view of an endoscope 100 according to the present disclosure, which is preferably a single-use endoscope. The endoscope 100 comprises: a proximal endoscope handle 102 and an insertion cord 104 extending distally from the endoscope handle 102. The insertion cord 104 is configured to be inserted into a patient's body cavity and comprises an insertion tube 106, a bending section 108 and a distal tip unit 110. The endoscope 100 further comprises a working channel 112 which extends from a working channel access port/biopsy port 114 provided at the endoscope handle 102 to the distal tip unit 110. The working channel 112 comprises a working channel tube 116, which is arranged inside the endoscope handle 102, the insertion tube 106 and the bending section 108. The endoscope handle 102 comprises an operating unit 118, formed as a lever, for bending the bending section 108 of the insertion cord 104. The working channel tube 116 and the working channel access port 114 are connected via a Y-connector 120. The endoscope 100 is connected to a monitor M via a connecting cable 122.

The monitor M includes video processing circuits operable to receive image data, present a graphical user interface to allow a user to manipulate image data with a touch screen, and, optionally, output a video signal to allow remote viewing of the images presented with the touch screen. Variations of the monitor M can be provided with various features of the monitor M but including other features. For example, it might not be desirable to provide a display module with a touch screen, or it might be desirable to omit a display module altogether. Omission of the display module might be beneficial to take advantage of evolving video display technologies which improve resolution and reduce cost. Provision of exchangeable medical device interfaces allows for adoption of evolving image sensor and endoscope technologies, thus use of existing or future-developed external video displays could allow presentation of higher resolution or otherwise improved video. Use of external video displays could also leverage existing capital investments.

Video processing circuits of the monitor may include the display module supported by a housing, medical device interfaces to connect endoscopes, a processor to process instructions to present images with a graphical user interface (GUI), a field-programmable gate array (FPGA) to receive the images from the endoscope and output variations thereof to the processor for combining with the GUI, and a video output board to output video. User interfaces may comprise a wireless interface operable to receive user inputs via a mouse, keyboard, or other physical user input devices. Example wireless interfaces include Bluetooth and Zigbee controllers. User interfaces may also comprise a USB port to receive a USB connector including the wireless interface or a USB connector of a wired user input device. Thus, the monitor M provides for flexibility in receiving user inputs via various user input devices, regardless whether a display module is integrated therewith.

The FPGA is optionally provided because it is capable of rapid power-up (i.e. short boot-up time) and thus is useful in emergency situations. FPGAs may also be provided in the medical device interfaces for the same reasons. FPGAs process data very fast compared to other memory/instruction combinations and are re-programmable. Therefore FPGAs facilitate presentation of a live view of the images captured by the endoscope in real-time with minimal latency so that the physician observing the live view can take immediate actions even in emergency situations. As technology evolves, the functionality of the FPGA may be combined with the processor. The monitor M is therefore not limited to the precise packaged integrated circuits described above but can be constructed to take advantage of design and cost targets and future video processing technologies. For example, faster/more costly memory may be used to increase graphics processing speed. Graphics processing may be provided in the FPGA or a processor that incorporates graphics processing logic may be used instead.

A positioning interface, or interface, functions to control the position of the insertion cord. The handle 102 is an example of a positioning interface and, unless stated otherwise, the terms are used interchangeably. The positioning interface also functions to provide the steering controls, e.g. knobs, levers, buttons, and the like, to steer the field of view of the camera and the elevator controls. Alternatively, a different positioning interface can be provided that is connected to the insertion cord and is detachably connected to a robotic arm. The insertion cord thus extends from the robotic arm, and the intrusive medical device is detachable from the robotic arm. The robotic arm responds to signals, including voice commands from an operator, to rotate, translate, and otherwise position the proximal end of the insertion cord, as an operator would do manually. The positioning interface can include control actuators, including manual control actuators. Alternatively or additionally, control actuators can be provided in or on the robotic arm or by the robotic system including the robotic arm, thereby potentially reducing the cost of the intrusive medical device. Example control actuators include single axis actuators, including linear motion actuators. A linear motion actuator may comprise a threaded rod coupled to a threaded nut portion, in which a motor rotates the rod to translate the nut portion.

Figure 3:
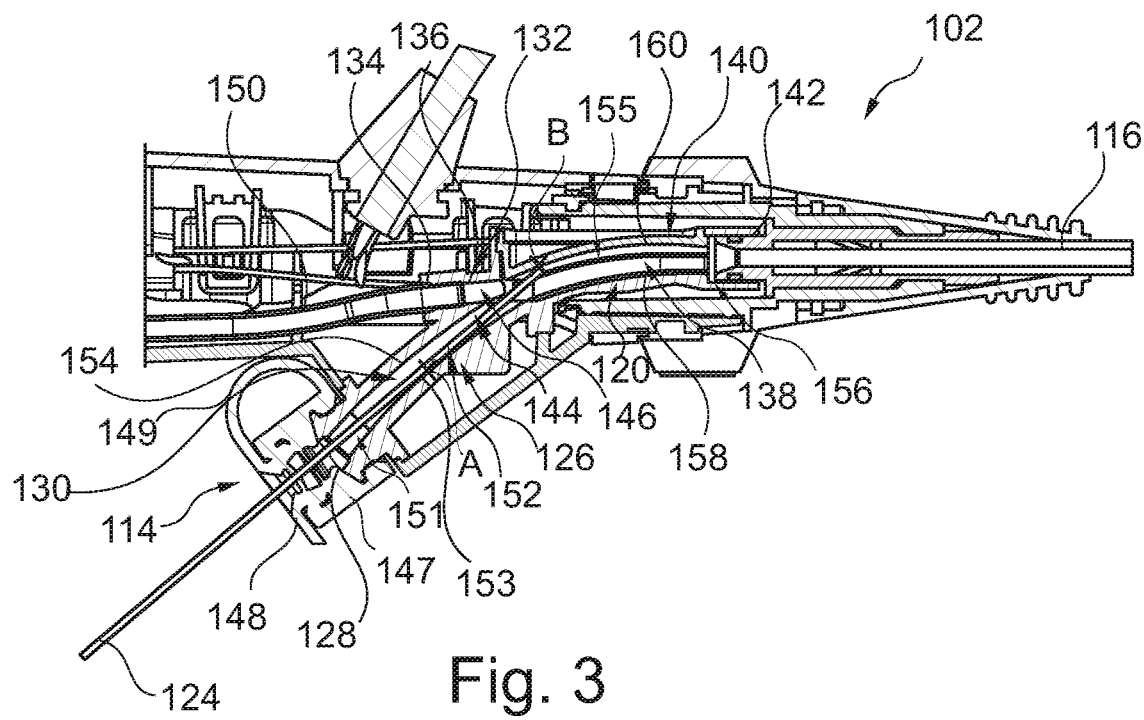
FIG. 3 shows a longitudinal sectional view through a portion of an endoscope handle including a Y-connector according to a first embodiment of the present disclosure.

With reference also to FIG. 3, when a surgical instrument 124 is inserted into the working channel 112, the surgical instrument 124 is inserted into the working channel access port 114 and guided through the Y-connector 120 into the working channel tube 116.

FIG. 3 shows a longitudinal sectional view through a portion of the endoscope handle 102 including the Y-connector 120. The Y-connector 120 comprises a first branch or socket 126 having a first opening 128. A first channel 130, preferably a biopsy channel, extends from the first opening 128 inside the first branch or socket 126. The Y-connector 120 further comprises a second branch or socket 132 with a second opening 134. A second channel 136, which is preferably a part/portion of a suction channel, extends from the second opening 134. The first channel 130 and the second channel 136 join each other/merge into each other to form a third joined channel 138. The third joined channel 138 extends inside a third branch or socket 140 towards a third opening 142. The first channel 130 and the third joined channel 138 form together an instrument insertion channel 144, through which the instrument 124 is inserted into the working channel tube 116. The second channel 136 and the third joined channel 138 form together a suction channel 146, through which fluid is sucked out of the patient's body cavity. The first opening 128/the first branch or socket 126 is connected to the working channel access port/biopsy port 114, which is configured to initially receive the surgical instrument 124. The working channel access port 114 is an elastic part having an adapter portion 147, e.g. for luer-lock, and a cap 148 connected to the adapter portion 147 via a strap 149, the cap 148 closing the adapter portion 147 and being removable from the adapter portion 147. The second opening 134 is connected to a suction tube 150. The third opening 142 is connected to the working channel tube 116. The connection between the third opening 142 and the working channel tube 116 is discussed in detail below.

Starting from the first opening 128 the first channel 130 comprises a (rather short) straight portion 151 and a curved portion 152. The first channel 130 may be described so as to be curved away from the second channel 136. In the longitudinal sectional view, the curved portion 152 of the first channel 130 comprises a curvature and a curve of the first channel 130 has two sides, a radial inner side/wall surface 153 and a radial outer side/wall surface 154. The radial outer wall surface 154 is closer to the second channel 136 than the radial inner wall surface 153. A radius of curvature of the curved portion 152 is between 50 mm and 150 mm, e.g. around 100 mm and a radiant/arc length of the curved portion 152 is between 10° and 30°, e.g. around 17°. In FIG. 3 a contacting point A is shown, in which an instrument 124 inserted into the first channel 130 contacts the inner wall surface 153 of the first channel 130.

The third joined channel 138 also comprises a curved portion 155 and a straight portion 156. The straight portion 156 is provided close to/adjacent the third opening 142. The curved portion 155 of the third joined channel 138 is curved so as to form an essentially continuous curvature with the curved portion 152 of the first channel 130. The curved portion 155 of the third joined channel 138 comprises a radial inner wall surface 158 and a radial outer wall surface 160. In particular, as shown in FIG. 3, there is provided a direct transition without kink between the radial inner wall surface 152 of the first channel 130 and the radial inner wall surface 158 of the third joined channel 138. Said differently, the third joined channel 138 continues a trajectory of the radial inner wall surface 152 of the first channel 130. The curved portion 155 of the third joined channel 138 comprises a curvature having a radius of curvature of between 20 mm and 80 mm, e.g. around 50 mm, and a radiant/arc between 30° and 50°, e.g. around 42°. In FIG. 3 a landing point B is shown, in which the instrument 124 inserted into the instrument insertion channel 144 hits the third joined channel 138.

The curvature of the first channel 130/the curved portion 152 of the first channel 130 changes a position of the contacting point A compared to the first channel of the related art endoscope 2 shown in FIG. 1. In particular, the contacting point A is provided in a middle portion of the first channel 130 inside the first branch or socket 126, in particular much closer to the working channel access port 114 compared to the contacting point A in the related art endoscope 2 shown in FIG. 1. Therefore, a distance between the contacting point A and the landing point B, which is the bending point on the radial outer wall surface 160 of the third joined channel 138 is increased compared to the related art endoscope 2 shown in FIG. 1. The surgical instrument 124 may thus be bent over a longer distance and a force required to bend the surgical instrument 124 as well as a general resistance a user feels during bending and any abrupt change in resistance levels decrease and are preferably minimized. In other words, a bending lever of the surgical instrument 124 increases because of the curved first channel 130.

The curvature of the third joined channel 138 in the curved portion 155 changes a landing angle α at which the surgical instrument 124 lands on/hits the radial outer wall surface 160 of the third joined channel 138 compared to the related art endoscope 2 shown in FIG. 1. The landing angle α is marked in FIG. 4 and becomes smaller due to the curvature. This leads to less resistance and a less abrupt change in resistance level during insertion of the surgical instrument 124. The curvature also increases the distance over which the surgical instrument 124 is bent and thus decreases the force required to bend the surgical instrument 124.

Figure 4:
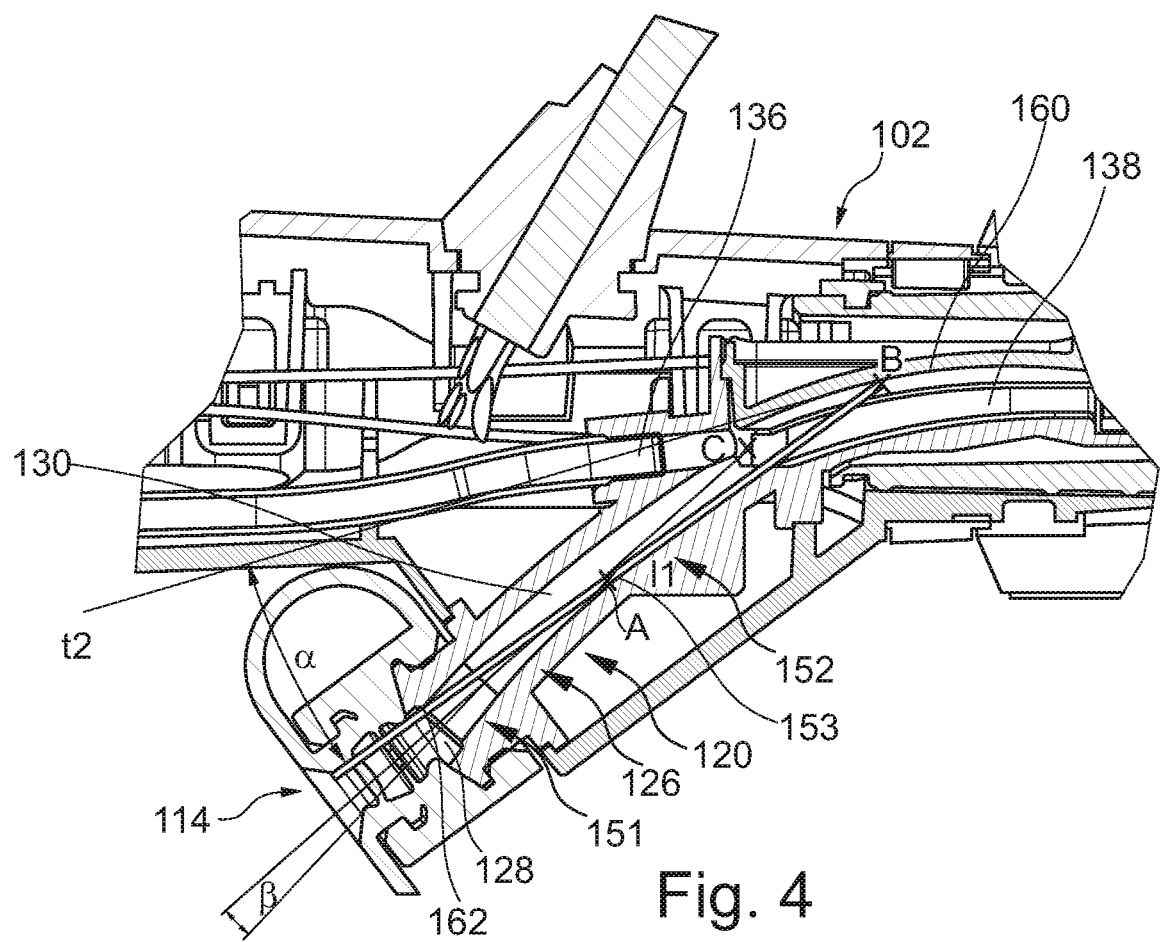
FIG. 4 shows a detail of the longitudinal sectional view of FIG. 3 illustrating geometric characteristics of the Y-connector according to the first embodiment.

FIG. 4 basically illustrates geometric characteristics of the Y-connector 120 according to the present disclosure. It can be seen that the straight portion 151 of the first channel 130 is straight and has an extension direction. An extension direction of the curved portion 152 of the first channel 130 at a point directly adjacent the straight portion 151 essentially corresponds to the extension direction of the straight portion 151. A main extension direction or axis of the first branch or socket 126 may e.g. be defined by a center of the first opening 128 and a bifurcation point/intersection point C where the first channel 130, the second channel 136 and the third joined channel 138 (axis/extension direction/trajectories of the same) intersect. As can be seen in FIG. 4 in combination with FIG. 3, the main extension direction or axis of the first branch or socket 126 and the extension direction at a start of the curved portion 152 of the first channel 130 form an extension direction angle 3 between them. Note that in FIG. 4 the opposite angle β is shown for purpose of presentation. The extension direction at the start of the curved portion 152 is negatively angled between 5° and 20° with respect to the main extension direction or axis of the first branch or socket 126. It is further possible to define a straight line from a radial outer point 162 of the first opening 128 to the contacting point A on the radial inner side 153 of the first channel 130 and to continue this straight line to the landing point B on the radial outer wall surface 160 of the third joined channel 138, namely an imaginary line l1. This straight line and a tangent t2 on the curvature of the third joined channel 138 in the landing point B form the landing angle α.

Figure 5:
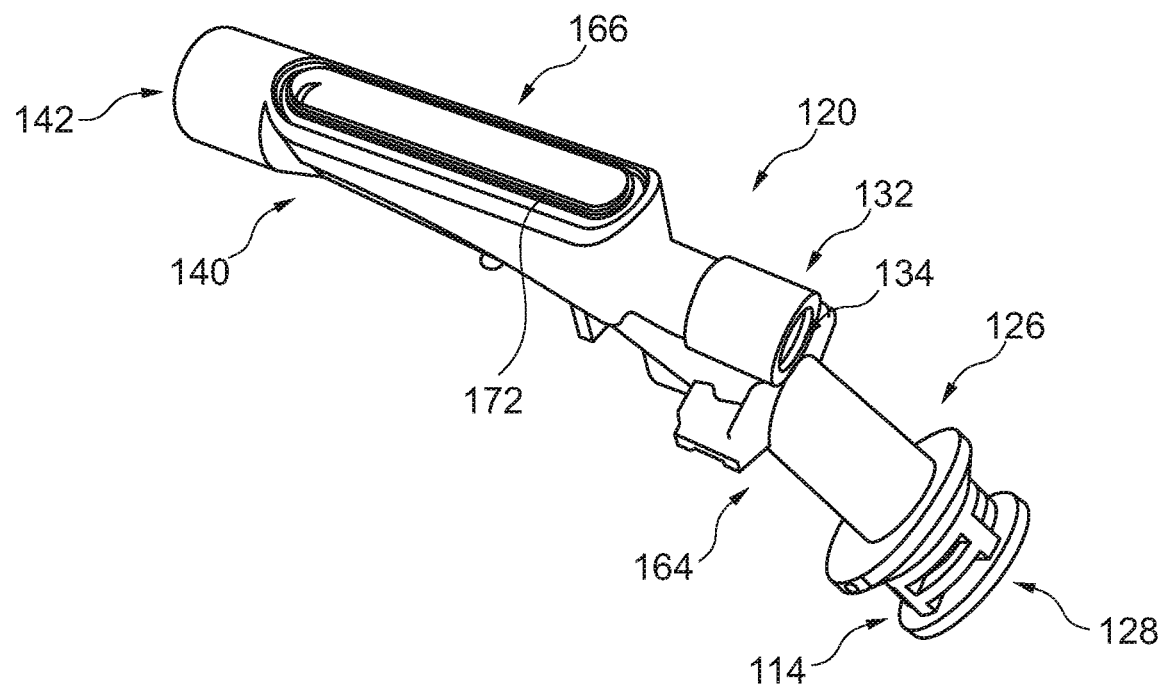
FIG. 5 shows an isometric view of a Y-connector comprising a first part and a second part according to the first embodiment.
Figure 6:
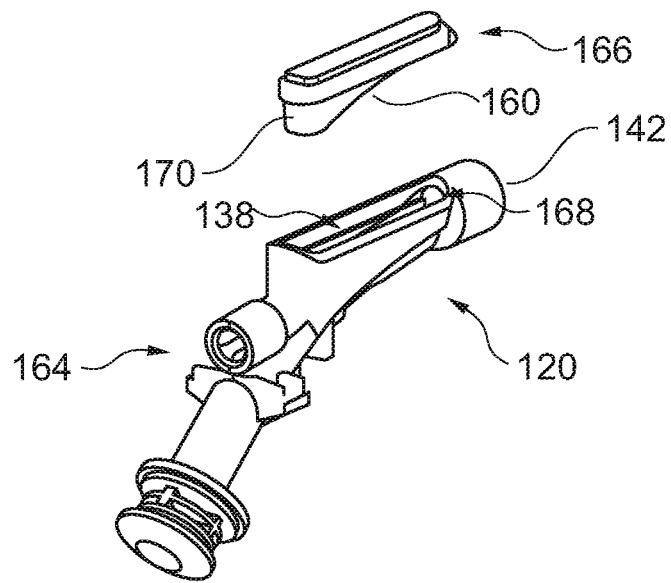
FIG. 6 shows an isometric view of the first part and the second part of the Y-connector according to the first embodiment.

FIGS. 5 and 6 show isometric views of the Y-connector 120. The Y-connector 120 comprises two parts, a first connector part 164 and a separate second connector part 166. FIG. 6 shows the first connector part 164 and the second connector part 166 separated from each other, while FIG. 5 shows the two parts of the Y-connector 120 put/assembled together to form one multi-piece Y-connector. The first connector part 164 is essentially a connector main body and comprises the first branch or socket 126 with the first opening 128, the second branch or socket 132 with the second opening 134, and a part/portion of the third branch or socket 140 including the third opening 142. In the part/portion of the third branch or socket 140 the first connector part 164 has an elongated opening 168. The part/portion of the third branch or socket 140 comprised in the first connector part 164 may be described as essentially tub-shaped. As shown in FIG. 5, the elongated opening 168 of the first connector part 164 may be closed by the lid-shaped second connector part 166. The second connector part 166 comprises/forms the radial outer wall surface 160 of the third joined channel 138. The second connector part 166 may be inserted into the elongated opening 168 of the first connector part 164 and closes the "tub" from above. The second connector part 166 decreases in width towards the third opening 142, so that the radial outer wall surface 160 of the curved portion 155 of the third joined channel 138 receives a desired curvature. Therefore, in a way a nose 170 is formed on a side of the second connector part 166 which is arranged further away from the third opening 142.

When the second connector part 166 is inserted into the first connector part 164, a groove 172 remains/is formed between the first connector part 164 and the second connector part 166. The groove 172 is provided to receive glue in order to fixedly attach the second connector part 166 to the first connector part 164.

FIG. 7 shows a longitudinal sectional view of the Y-connector 120. As mentioned above, the Y-connector 120 is a multi-piece connector and comprises the first connector part 164 and the second connector part 166. FIG. 7 clearly shows that the radial outer wall surface 160 of the third joined channel 138 is a part/portion of the second connector part 166. The outer wall surface 160 also includes the landing point B, where an instrument 124 hits a wall surface of the third joined channel 138 as previously discussed with reference to FIG. 4. The radial outer wall surface 160 does not continue a trajectory of the radial outer wall surface 154 of the first channel 130. There is a step between the two outer wall surfaces 154 and 160. The radial outer wall surface 160 is in a way retracted compared to the radial outer wall surface 154 of the first channel 130. Furthermore, the second connector part 166 extends into the straight portion 156 of the third joined channel 138 to form a jump 174, which is formed like a ramp, for the (surgical) instrument 124. The jump 174 is arranged and provided to direct the instrument 124 through a center of the third opening 142. The second channel 136 extends tangentially with respect to the radial inner wall surface 158 of the third joined channel 138. FIG. 8 shows a cross section through the third joined channel 138 of the Y-connector 120 at line A-A in FIG. 7. The third joined channel 138 has a cross-sectional shape of essentially an elongated hole. As can be derived from FIG. 7 and FIG. 8 in combination the radial outer wall surface 160 is curved both in the longitudinal sectional view shown in FIG. 7 and in the cross section shown in FIG. 8. The radial outer wall surface 160 is thus a curved surface curved in two directions so as to keep the surgical tool 124 in a center of the radial outer wall surface 160 before delivering it off the jump 174.

The radial outer wall surface 160 of the third joined channel 138 is retracted to increase the distance between the contacting point A and the landing point B. As the landing point B is on the radial outer wall surface 160, which is a part/portion of the second connector part 166, the landing point B is moved away from the first channel 130, when the radial outer wall surface 160 is retracted. The jump 174 of the second connector part 166 allows the surgical instrument 124 to enter the working channel tube 116 during its insertion preferably without touching the walls of the working channel tube 116, which would give an abrupt change in resistance when inserting the surgical instrument 124.

The second channel 136 extends tangentially from the radial inner wall surface 158 of the third joined channel 138 to provide a clean path for any fluids that are sucked out of the body cavity via the second channel 136. The tangential connection makes sure that there are no edges or curves in the flow path that could impair a functional fluid flow from the body cavity to a suction tube 150 attached to the second branch or socket 132 and to direct potential solid matter (clots) in the flow directly into the second channel 136.

FIG. 9 shows another longitudinal sectional view through the endoscope handle 102 with the Y-connector 120. The Y-connector 120 is provided inside the endoscope handle 102. At a distal end of the Y-connector 120, in particular adjacent/in close proximity of the third opening 142, the Y-connector 120 is rotatably connected to the working channel tube 116. In particular, inside the third opening 142 of the Y-connector 120 a rotational adapter 176, which is a part able to transform rotational motion, is provided. The rotational adapter 176 is connected to the working channel tube 116. The rotational adapter 176 and the working channel tube 116 may rotate together. A sealing ring 178 is provided that seals between the Y-connector 120 and an outer side of the rotational adapter 176. The rotational adapter 176 is connected with a tubular member 180 which is again connected with a control ring 182. The control ring 182, the tubular member 180 and the rotational adapter 176 are comprised in a distal handle portion 184. The insertion cord 104 is connected to the distal handle portion 184, and the distal handle portion 184 and the insertion cord 104 are rotatably mounted and axially secured with respect to a proximal handle portion 186. Therefore, the insertion cord 104 and the distal handle portion 184, and thus the control ring 182, the tubular member 180, the rotational adapter 176 and the working channel tube 116 may rotate with respect to the proximal handle portion 186, which enables a user to ergonomically adjust the proximal handle portion, e.g. to reach a better accessibility to the working channel access port 114.

Figure 10:
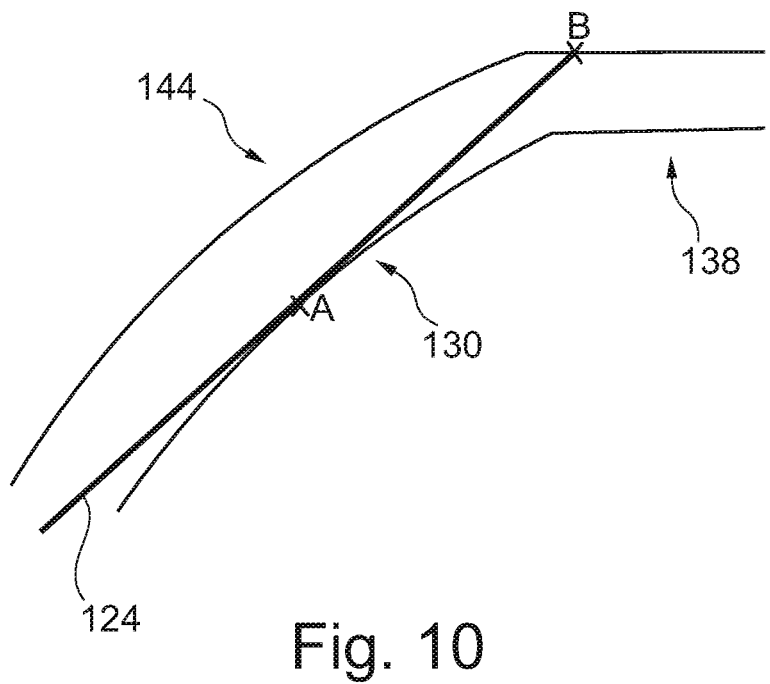
FIG. 10 shows a schematic view of an instrument insertion channel according to a second embodiment of the present disclosure.

FIG. 10 shows a schematic view of the instrument insertion channel 144 according to a second embodiment of the present disclosure. The first channel 130 and the third joined channel 138 form together the instrument insertion channel 144. The first channel 130 is curved and the third joined channel 138 is straight. The instrument 124 that is inserted into the instrument insertion channel 144 touches the curved first channel 130 in the contacting point A and is bent in the landing point B. Through the curvature of the first channel 130, the distance between contacting point A and landing point B increases compared to the related art endoscope 2 shown in FIG. 1. The increase in the distance between the contacting point A and the landing point B increases a bending lever of the instrument 124. Thus, the instrument 124 requires less force to be bent.

Figure 11:
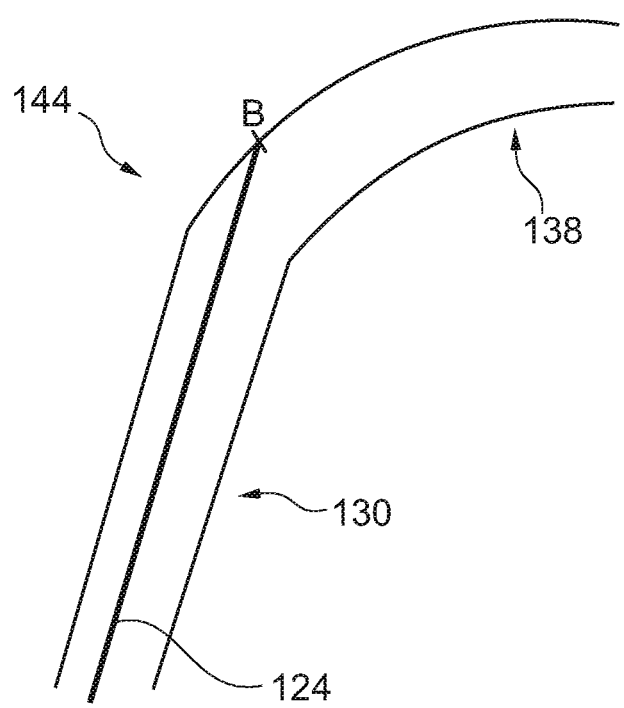
FIG. 11 shows a schematic view of an instrument insertion channel according to a third embodiment of the present disclosure.

FIG. 11 shows a schematic view of an instrument insertion channel 144 according to a third embodiment of the present disclosure. The first channel 130 and the third joined channel 138 form together the instrument insertion channel 144. The first channel 130 is straight while the third joined channel 138 is curved. The instrument 124 that is inserted into the first channel 130 hits the third joined channel 138 in the landing point B. The landing angle in the landing point B is defined as the angle between a tangent t2 to the curved third joined channel 138 in the landing point B and the extension direction of the instrument 124. The landing angle decreases because of the curvature of the third joined channel 138 compared to the related art endoscope 2 shown in FIG. 1. The smaller the landing angle, the smaller is the resistance and an abrupt change in resistance of the instrument 124 hitting the radial outer wall surface 160 of the third joined channel 138.

The following items are examples of various embodiments and variations thereof disclosed above, and others:

1. An endoscope (100) comprising: an endoscope handle or interface (102); and an insertion cord (104) extending from the endoscope handle or interface (102) and configured to be inserted into a patient's body cavity; the endoscope handle (102) comprising a Y-connector (120) having: a first branch or socket (126) having a first opening (128) from which a first channel (130) extends; a second branch or socket (132) having a second opening (134) from which a second channel extends (136); and a third branch or socket (140) having a third opening (142), wherein the first channel (130) and the second channel (136) join each other in a third joined channel (138) and the third joined channel (138) extends inside the third branch or socket (140) towards the third opening (142); wherein the first channel (130) and the third joined channel (138) form together an instrument insertion channel (144) of the Y-connector (120), the second channel (136) and the third joined channel (138) form together a suction channel (146) of the Y-connector (120), and a working channel tube (116) is directly or indirectly connected to the third joined channel (138) and extends from the endoscope handle or interface (102) into the insertion cord (104), characterized in that the first channel (130) is a curved channel having a curvature at least in sections (152) inside the first branch or socket (126) and/or the third joined channel (138) is a curved channel having a curvature at least in sections (155) inside the third branch or socket (140).

2. Endoscope (100) according to item 1, characterized in that the first channel (130) is formed so as to be configured to pre-bend an instrument (124) inserted into the instrument insertion channel (144) inside the first branch or socket (126) through its curvature, in particular through three-point-bending.

3. Endoscope (100) according to item 1 or 2, characterized in that the first branch or socket (126) has a main extension direction or axis and an extension direction of the first channel (130) is at least in sections, in particular in a portion of the first channel (130) starting from the first opening (128), angled with respect to the main extension direction or axis of the first branch or socket (126) in an anti-clockwise direction.

4. Endoscope (100) according to any one of items 1 to 3, characterized in that a cross-section of the first channel (130) is at least in sections essentially circular, and a cross-section of the third joined channel (138) has at least in sections an essentially oblong hole shape.

5. Endoscope (100) according to any one of items 1 to 4, characterized in that a portion of a wall (160) of the third joined channel (138) is retracted or distanced with respect to a trajectory of the first channel (130).

6. Endoscope (100) according to any one of items 1 to 5, characterized in that a jump (174) is provided in the third joined channel (138) adjacent or close to the third opening (142), the jump (174) being configured to direct an instrument (124) inserted into the instrument insertion channel (144) essentially centrally through the third opening (142).

7. Endoscope (100) according to any one of items 1 to 6, characterized in that the second channel (136) has a main extension direction forming essentially a tangent to a radial inner wall surface (158) of the third joined channel (138).

8. Endoscope (100) according to any one of items 1 to 7, characterized in that the instrument insertion channel (144) formed by the first channel (130) and the third joined channel (138) extends such that an imaginary straight line (I1) forming a tangent (t1) on a wall surface (153) of the first channel (130) and contacting the wall surface (153) of the first channel (130) at a contact point (A) hits or cuts a wall surface (160) of the third joined channel (138) at a landing point (B), and contacts or starts at a point (162) of the first opening (128).

9. Endoscope (100) according to item 8, characterized in that a tangent (t2) on the third joined channel (138) defined by the landing point (B) and a curvature at the landing point (B)) and the imaginary straight line (I1) form a landing angle (a) between 0° and 20°.

10. Endoscope (100) according to any one of items 1 to 9, characterized in that the first channel (130) and the third joined channel (138) are curved channels having a curvature at least in sections (152, 155), wherein a curvature of the first channel (130) directly transitions into a curvature of the third joined channel (138), and wherein a majority-length portion, preferably at least 60%, especially preferred at least 70%, of the instrument insertion channel (144) formed by the first channel (130) and the third joined channel (138) is continuously curved.

11. Endoscope (100) according to any one of items 1 to 10, characterized in that the first channel (130) has at least in sections a first radius of curvature (r1) and the third joined channel (138) has at least in sections a third radius of curvature (r3), wherein the first radius of curvature (r1) is greater than the third radius of curvature (r3); and/or the first channel (30) has a first radiant and the third joined channel (38) has a third radiant, wherein the third radiant is greater than the first radiant.

12. Endoscope (100) according to any one of item 1 to 11, characterized in that the Y-connector (120) is a multi-piece connector comprising at least a first connector part (164) and a separate second connector part (166) that are attached to each other.

13. Endoscope (100) according to any one of items 1 to 12, characterized in that the first channel (130) and the second channel (136) of the Y-connector (120) are entirely formed by the first connector part (164), and the third joined channel (138) of the Y-connector (120) is formed by both the first connector part (164) and the second connector part (166).

14. Endoscope (100) according to any one of items 1 to 13, characterized in that the endoscope handle (102) comprises a proximal handle portion (188) and a distal handle portion (186) and the distal handle portion (186) is rotatable with respect to the proximal handle portion (188).

15. System comprising: an endoscope (100) according to any one of items 1 to 14; and a monitor (M).

16. A method comprising:
providing an endoscope including a handle; an insertion cord extending from the handle and configured to be inserted into a patient's body cavity; and a working channel tube extending from the handle into the insertion cord; the handle comprising a Y-connector having: a first branch or socket having a first opening from which a first channel extends; a second branch or socket having a second opening from which a second channel extends; and a third branch or socket having a third opening, wherein the first channel and the second channel join each other in a third joined channel and the third joined channel extends inside the third branch or socket towards the third opening, wherein the first channel and the third joined channel form together an instrument insertion channel of the Y-connector, the second channel and the third joined channel form together a suction channel of the Y-connector, and the working channel tube is directly or indirectly connected to the third joined channel and, wherein the first channel is a curved channel having a curvature at least in a section inside the first branch or socket and/or the third joined channel is a curved channel having a curvature at least in a section inside the third branch or socket; and pre-bending an instrument in the first channel before inserting the instrument into the third joined channel.

LIST OF REFERENCE SIGNS 2 endoscope
4 endoscope handle
6 Y-connector
8 working channel
10 (surgical) instrument
12 working channel access port
14 working channel tube
16 first branch or socket
18 first opening
20 first channel
22 second branch or socket
24 second opening
26 second channel
28 third joined channel
30 third branch or socket
32 third opening
34 wall surface
100 endoscope
102 endoscope handle
104 insertion cord
106 insertion tube
108 bending section
110 distal tip unit
112 working channel
114 working channel access port
116 working channel tube
118 operation handle
120 Y-connector
122 connecting cable
124 surgical instrument
126 first branch or socket
128 first opening
130 first channel
132 second branch or socket
134 second opening
136 second channel
138 third channel
140 third branch or socket
142 third opening
144 instrument insertion channel
146 suction channel
147 adapter portion
148 cap
149 strap
150 suction tube
151 straight portion of first channel
152 curved portion of first channel
153 radial inner wall surface of first channel
154 radial outer wall surface of first channel
155 curved portion of third joined channel
156 straight portion of third joined channel 158 radial inner wall surface of the third joined channel
160 radial outer wall surface of the third joined channel
162 radial outer point
164 first connector part
166 second connector part
168 elongated opening
170 nose
172 groove
174 jump
176 rotational adapter
180 tubular member
182 control ring
184 distal handle portion
188 proximal handle portion
A contacting point
B landing point
M monitor
α landing angle
β extension direction angle
I1 imaginary straight line
r1 first radius of curvature
r3 third radius of curvature
t1 tangent on first channel in point A
t2 tangent on third joined channel in point B

We claim:

1. An endoscope comprising:
a handle;
an insertion cord extending from the handle and configured to be inserted into a patient's body cavity; and
a working channel tube extending from the handle into the insertion cord;
the handle comprising a Y-connector having:
   a first branch including a first opening, a curved portion, and a first channel, the first opening comprising a radial outer point, the curved portion comprising a radial inner wall surface opposite a radial outer wall surface and a contacting point on the radial inner wall surface, the first channel extending distally from the first opening;
   a second branch including a second opening from which a second channel extends; and
   a third branch including a third opening, a curved portion, and a third joined channel, the curved portion comprising a radial inner wall surface, a radial outer wall surface and a landing point on the radial outer wall surface,
wherein the first channel and the second channel are joined in the third joined channel and the third joined channel extends inside the third branch towards the third opening,
wherein the first channel and the third joined channel form together an instrument insertion channel of the Y-connector, the second channel and the third joined channel form together a suction channel of the Y-connector, and the working channel tube is directly or indirectly connected to the third joined channel,
wherein a first straight line extending from the radial outer point of the first opening to the landing point on the radial outer wall surface of the third branch contacts the contacting point on the radial inner wall surface of the first branch, and
wherein the first straight line and a straight line tangential to the landing point on the radial outer wall surface of the third branch form a landing angle of between 0 and 20 degrees.

2. The endoscope of claim 1, wherein a curvature of the first branch comprises a negative angle between 5° and 20°.

3. The endoscope of claim 2, wherein the curvature starts from the first opening.

4. The endoscope of claim 1, wherein at least in a section thereof, a cross-section of the first channel is circular, and wherein at least in a section thereof, a cross-section of the third joined channel has an oblong hole shape.

5. The endoscope of claim 1, wherein a portion of a wall of the third joined channel is retracted or distanced with respect to a trajectory of the first channel.

6. The endoscope of claim 1, wherein a jump is provided in the third joined channel adjacent or close to the third opening, the jump being configured to direct an instrument inserted into the instrument insertion channel centrally through the third opening.

7. The endoscope of claim 1, wherein the second channel has a main extension direction forming a tangent to a radial inner wall surface of the third joined channel.

8. The endoscope of claim 1, wherein the straight line tangential to the landing point is defined by the landing point and a curvature at the landing point.

9. The endoscope of claim 1, wherein a curvature of the first channel directly transitions into a curvature of the third joined channel, and wherein a majority-length portion of the instrument insertion channel is continuously curved.

10. The endoscope of claim 9, wherein the majority-length portion comprises at least 60% of the instrument insertion channel.

11. The endoscope of claim 1, wherein a curvature of the first channel comprises a first radius of curvature and a curvature of the third joined channel comprises a third radius of curvature, wherein the first radius of curvature is greater than the third radius of curvature.

12. The endoscope of claim 1, wherein the Y-connector is a multi-piece connector comprising at least a first connector part and a separate second connector part that are attached to each other.

13. The endoscope of claim 12, wherein the first channel and the second channel are entirely formed by the first connector part, and the third joined channel is formed by both the first connector part and the second connector part.

14. The endoscope of claim 1, wherein the handle comprises a proximal handle portion and a distal handle portion and the distal handle portion is rotatable with respect to the proximal handle portion.

15. A visualization system comprising: an endoscope according to claim 1; and a monitor.

16. The endoscope of claim 1, wherein at least 50% of a length of the first channel is continuously curved.

17. The endoscope of claim 1, wherein the curved portion of the first channel is adjacent the curved portion of the third channel, and wherein a step is provided at a transition between the radial outer wall surface of the first channel and the radial outer wall surface of the third channel.

18. The endoscope of claim 1, wherein at least 50% of a length of the first channel is continuously curved and at least 50% of a length of the third joined channel is continuously curved.

19. The endoscope of claim 18, wherein the curved portion of the first channel is adjacent the curved portion of the third channel, and wherein the radial inner wall surface of the first channel transitions continuously and without a kink into the radial inner wall surface of the third channel.

20. The endoscope of claim 18, wherein the curved portion of the first channel is adjacent the curved portion of the third channel, and wherein a step is provided at a transition between the radial outer wall surface of the first channel and the radial outer wall surface of the third channel.

21. The endoscope of claim 18, wherein a curvature of the first channel comprises a first radius of curvature and a curvature of the third joined channel comprises a third radius of curvature, and wherein the first radius of curvature is greater than the third radius of curvature.

\* \* \* \* \*